United States Patent
Poczatek

(10) Patent No.: US 10,156,300 B1
(45) Date of Patent: Dec. 18, 2018

(54) SEWER FLOOD CONTROL SYSTEMS

(71) Applicant: Jeff H. Poczatek, Skokie, IL (US)

(72) Inventor: Jeff H. Poczatek, Skokie, IL (US)

(*) Notice: Subject to any disclaimer, the term of this patent is extended or adjusted under 35 U.S.C. 154(b) by 243 days.

(21) Appl. No.: 13/573,743

(22) Filed: Oct. 4, 2012

(51) Int. Cl.
| | |
|---|---|
| *E03F 5/22* | (2006.01) |
| *E03F 3/02* | (2006.01) |
| *F16L 1/028* | (2006.01) |
| *F17D 1/14* | (2006.01) |
| *F17D 5/02* | (2006.01) |
| *F16L 1/06* | (2006.01) |
| *E03F 3/04* | (2006.01) |

(52) U.S. Cl.
CPC .............. *F16L 1/028* (2013.01); *E03F 3/04* (2013.01); *F16L 1/06* (2013.01); *F17D 1/14* (2013.01); *F17D 5/02* (2013.01)

(58) Field of Classification Search
CPC ..... E03F 5/10; E03F 5/107; E03F 5/12; E03F 5/22; E03F 7/04
See application file for complete search history.

(56) References Cited

U.S. PATENT DOCUMENTS

| | | | | |
|---|---|---|---|---|
| 2,421,066 A | * | 5/1947 | Howe | E03F 5/22 137/115.02 |
| 2,431,640 A | * | 11/1947 | Gordon | E03F 5/22 137/115.02 |
| 2,739,662 A | * | 3/1956 | Sofia | E03F 5/22 137/362 |
| 4,553,561 A | * | 11/1985 | Morris | E03F 5/12 137/357 |
| 4,997,312 A | * | 3/1991 | Regan | E03F 5/101 137/236.1 |
| 2003/0014923 A1 | * | 1/2003 | Robbins | E02D 31/10 52/1 |
| 2014/0326332 A1 | * | 11/2014 | Pasco | E03F 5/22 137/364 |

* cited by examiner

*Primary Examiner* — Benjamin F Fiorello
(74) *Attorney, Agent, or Firm* — Jon C. Gealow

(57) ABSTRACT

A sewer flood control system including a vault formed of a strong light weight material. The vault being formed of one or more sections which can be carried by one or more persons and lowered into a hole dug by hand which is only slightly larger in cross section than the vault sections. A base under said vault sections, with a sump extending below said base. A pair of check valves located near the bottom of the vault, connected in series between a pipe connect to a public sewer system and a sewage discharge pipe from a building. A flow path for sewage from the building to enter the sump when the check valves are closed, and a ejector pump in said sump for discharge said sewage into the pipe connect to the public sewer system.

9 Claims, 11 Drawing Sheets

SEWER FLOOD CONTROL SYSTEMS

CROSS-REFERENCE TO RELATED APPLICATION

The following U.S. patent application is hereby incorporated by reference in its entirety for its teachings:

U.S. patent application Ser. No. 61/543,394 for SEWER FLOOD CONTROL SYSTEM by Jeff Poczatek, filed Oct. 5, 2011.

FIELD OF THE INVENTION

This invention relates to a sewer flood control system. A sewer flood control system in accordance with this invention prevents the entry of water from an overloaded public sewer system into a building through its sewer connection to the public sewer system. It also provides for discharge of sewage from the building into a public sewer system which is in an overload condition.

BACKGROUND OF THE INVENTION

A sewer flood control system for a building requires a pit or hole which extends from ground level to below the sewer pipe connecting the building to the public sewer system. Heavy equipment is frequently used to dig the pit or hole. The use of such heavy equipment results in considerable destruction of the landscaping around the area of the pit or hole, and also of the path used to move the heavy equipment between the street and the location of the pit or hole between the building and the street. The pit or hole must be lined, and again heavy equipment has been used to lower a concrete liner or vault into the pit or hole. The hole dug to receive the concrete vault must be considerably larger in diameter than the outside dimensions of the vault, typically a 60 inch diameter hole for a 48 inch diameter vault.

It has been found desirable to be able to install vaults in pits or holes of various depths without the need for heavy equipment to dig the hole for the vault and to install a waterproof vault. By digging the hole for a vault by hand, the damage done to the landscaping by the movement of and use of heavy equipment to dig the hole is avoided. If a pit is dug by hand, and the vault is constructed of a light weight material, a 48 inch inside diameter vault requires only a 50 to 52 inch diameter hole. Considerably less dirt is removed in digging the pit, thus providing savings with respect to both the digging and the hauling away of the removed material. Further, by forming the vault of a light weight material, which can be carried to the hole by hand, the use of heavy equipment is further avoided.

Federal laws now require the separation of contaminated sewer water from relatively clean storm or rainwater. Therefore the vault must be formed with sealed joints, to prevent infiltration of clean storm or rainwater into the vault, or the outward flow or filtration of contaminated sewer water.

While shoring is not required while digging a hole with heavy equipment, when a hole is dug by hand, with workers in the hole, OSHA rules require cave in protection when the depth of the hole exceeds 4 feet. Thus, it is desirable to form the vault with vertical sections of light weight material, which can be lowered into the hole as the depth of the hole is increased, thus providing the OSHA required shoring. However, some jurisdictions in implementing the OSHA requirement my require a shoring structure separate from the vault, inside of which the vault is placed. In which case, it is desireable to form both the shoring structure and the vault with vertical sections of light weight material.

SUMMARY OF THE INVENTION

The sewer flood control system of this invention overcomes the use of heavy equipment in installing the system. The sewer flood control system of this invention includes an essentially water tight below ground enclosure or vault, and an arrangement of valves, piping, and a pump located within the vault. The vault is formed of vertically stacked sections, which line a hole dug by hand above the sewer pipe connecting a building sewage discharge pipe to the public sewer system. This invention includes a method of assembling a sewer flood control system wherein sections of a vertically stacked housing or vault are lowered by hand into the hole as it is dug, so as to provide protection from collapse of the sides of the hole on a person or persons digging the hole. The hole extends a short distance below the building sewage discharge pipe. A waterproof bottom is provided in the hole, and waterproof connections are provided between the bottom and the lowest telescoping vault section, and between the telescoping sections, so as to form an essentially water tight enclosure. A water tight sump extends beneath the waterproof bottom.

Located within the water tight enclosure, are two check valves connected in series between the sewer pipe extending from the building, and the sewer pipe connected to the public sewer system. These check valves prevent the flow of contaminated sewer water from an overloaded public sewer system into the building. When the public sewer system becomes overloaded, the check valves close, and a flow path is provided for sewage from the building to enter the waterproof vault, and more particularly the sump. A pump is provided in the sump to discharge sewage in the sump, when it reached a predetermined level to the public sewer system through a flow path which bypasses the two check valves connected in series.

DETAILED DESCRIPTION OF APPLICANT'S INVENTION

Figure 1:
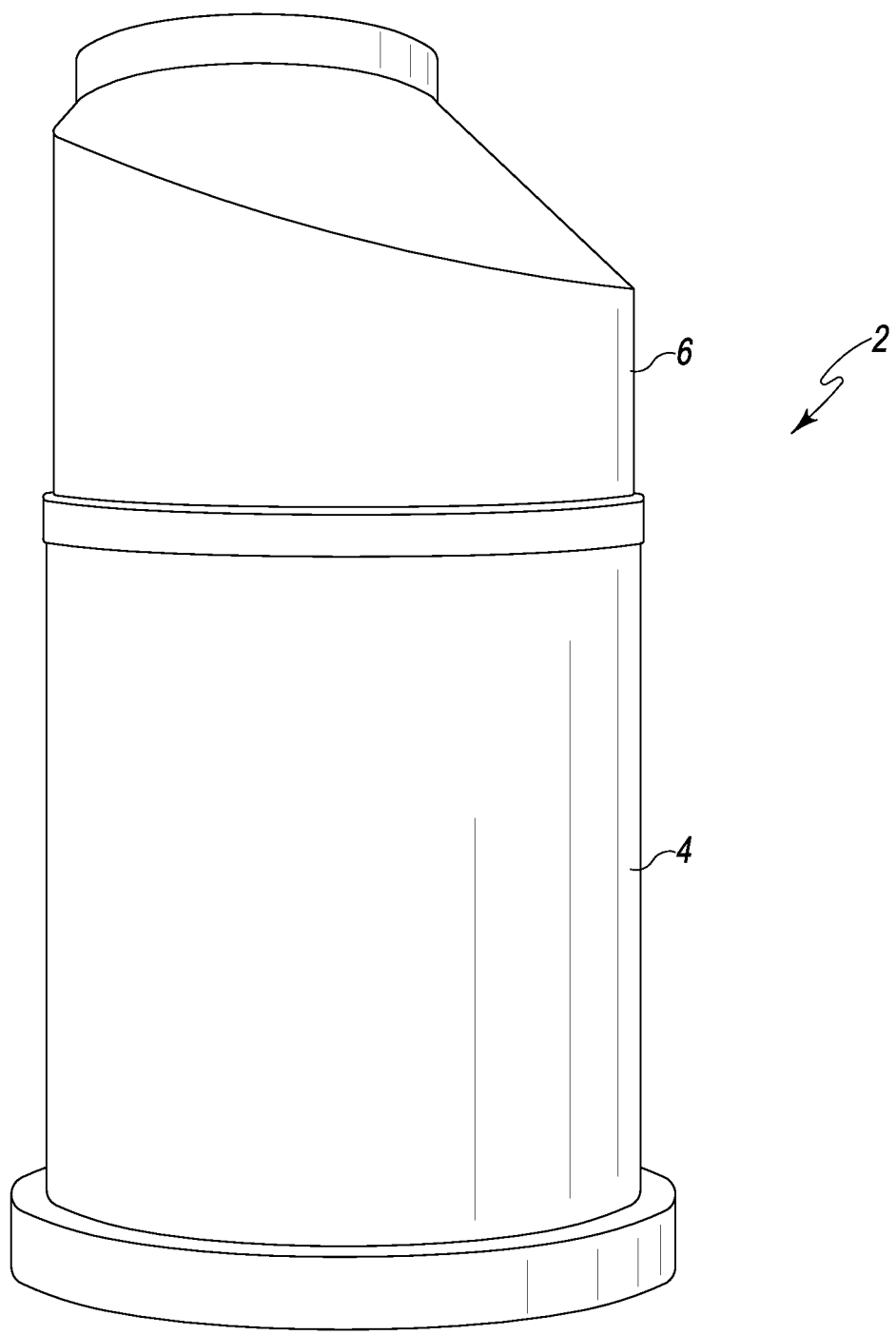
FIG. 1 is a perspective view of a first preferred embodiment of the vault liner of the applicant's invention.

A perspective view of a first preferred embodiment of the applicant's vault is shown in FIG. 1. As shown in FIG. 1, the vault 2 is constructed of a light weight structurally strong material such as fiberglass or a heavy duty plastic or other composite material and comprises a lower section 4 and a top section 6 which typically are round. Wherein the vault of this invention is used with respect the sewers found at varying depths below the ground surface, the lower section is provided in various lengths, such as 5 foot, 6 foot, and 7 foot.

Figure 2:
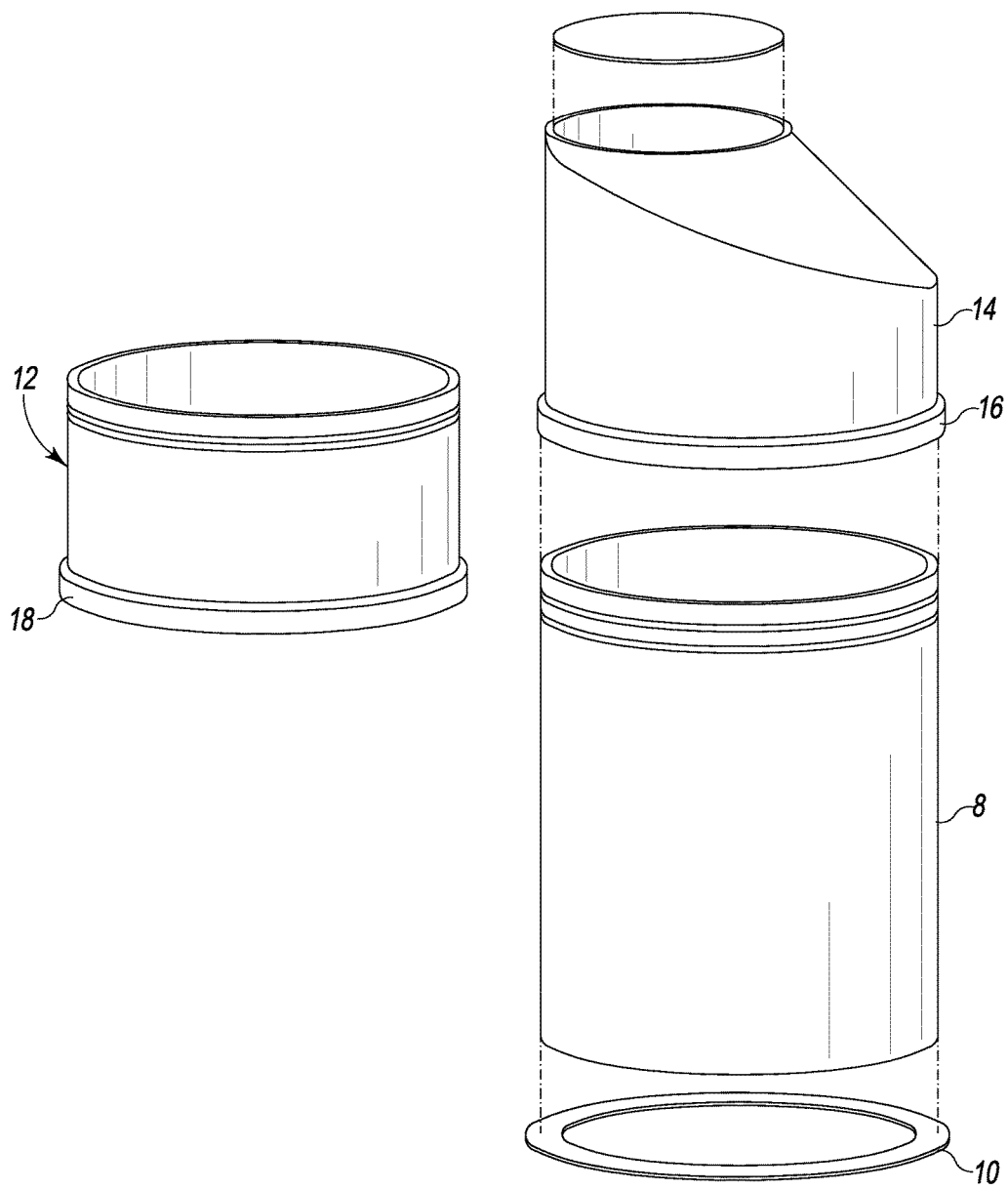
FIG. 2 is an exploded perspective view of an alternate of the first preferred embodiment of the fault liner of the applicant's invention.

In accordance with the first embodiment of the applicant's invention, the vault may also be formed of three sections as shown in FIG. 2. The lower edge of lower section 8 rests on a ring 10, which is provided to lessen the likely-hood of the vault sinking into the earth below the vault. A middle section 12 is located between the lower section 8 and a top section 14. The lower end of the top section 14 is provide with an enlarged flange 16 for receiving the top edge of the middle section 12. The bottom edge of the middle section 12 is provided with an enlarged flange 18 for receiving the top edge of the lower section 8.

Figure 3:
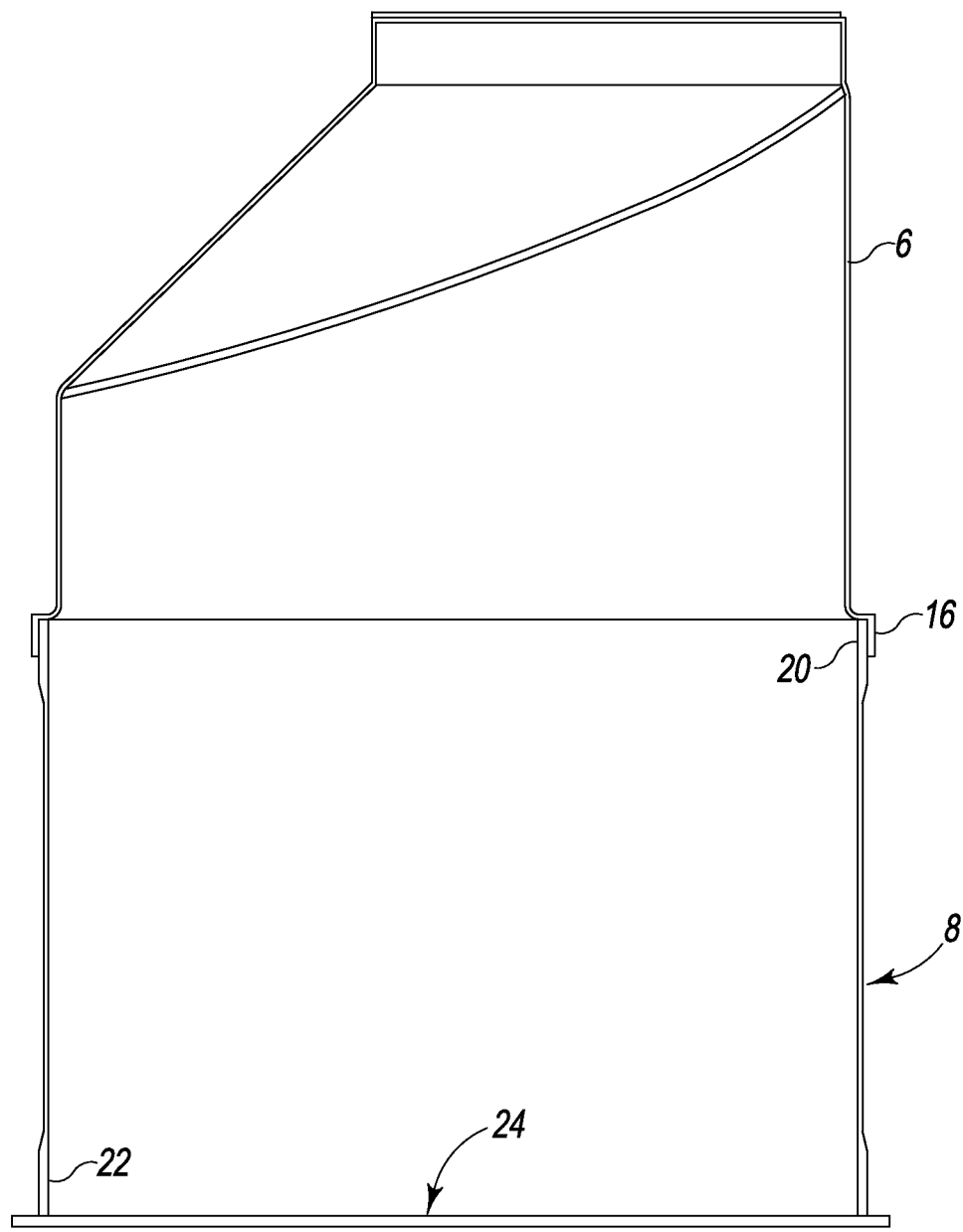
FIG. 3 is a cross-sectional view of the first preferred embodiment of the vault liner of the applicant's invention as shown in FIG. 1.

Referring to FIG. 3, the lower end the top section 6 is provided with an enlarged flange 16 for receiving the top edge of the lower section 8. The top edge 20 of the lower section 8 is formed with increased thickness with respect to the rest of the sidewall, so as to provide a stronger and more substantial rigid and secure connection with the flange 16. The bottom edge 22 of the lower section 8 need not be formed with an increased thickness, since it rests on the ring 24, which can accommodate some variation in shape. However, since the lower section 8 will be needed in different lengths, for different installation, it may be necessary or convenient to cut a shorter lower section 8 from a longer length section in order to provide the desired shorter length for a particular installation. By providing both the bottom edge 22 of the lower section 8 and the top edge 20 with an increased thickness, it is possible to use a first portion as the lower section in one installation and the second portion as the lower section in another installation, since both portions will have an edge with increased thickness for mating with the flange 16 on the lower end of the top section 6. By being able to use both portions of a lower section cut for installation, material costs are reduced. The lower section 8 can be provided in different lengths, such as 4, 5, 6 and 7 feet, to accommodate forming vaults for sewers at varying depths. Further, since the lower sections can be cut to form two lower sections, various lengths of lower sections can be provided, with very little way of material.

Figure 4:
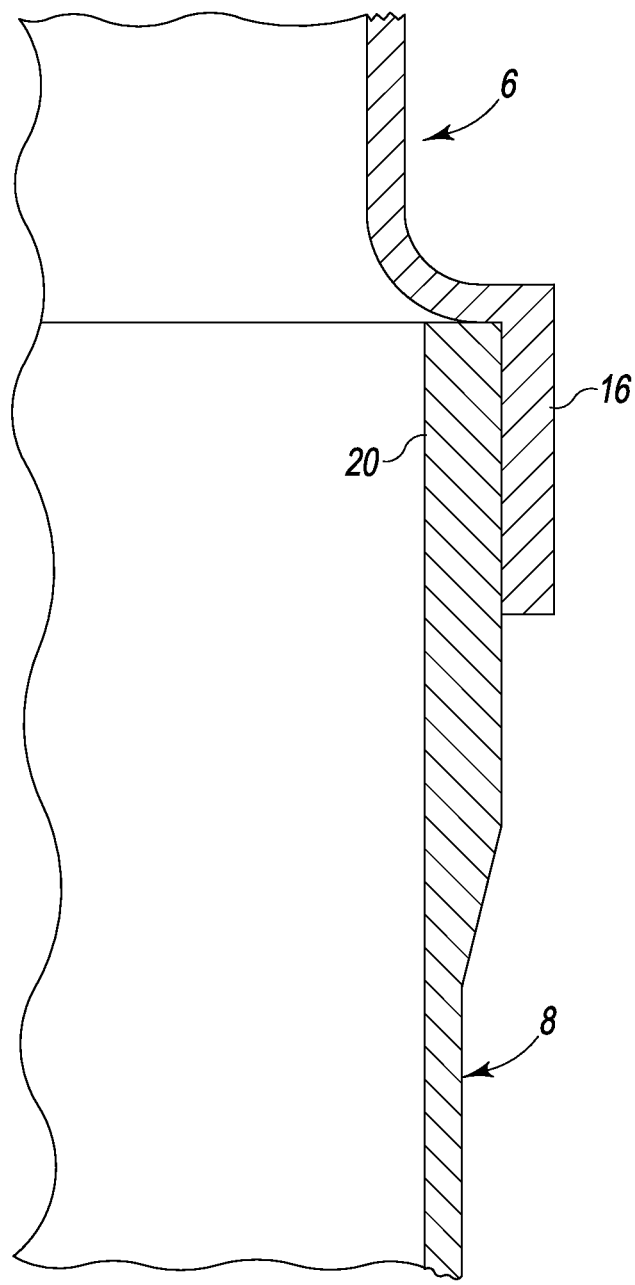
FIG. 4 is an exploded view of the mating portions of the top and bottom sections of the first preferred embodiment of the vault liner of the applicant's invention as shown in FIG. 1.

Referring to FIG. 4, the thickened upper wall 20 of a lower section 8 is shown in contact with the enlarged flange 16 of the top section 6.

Figure 5:
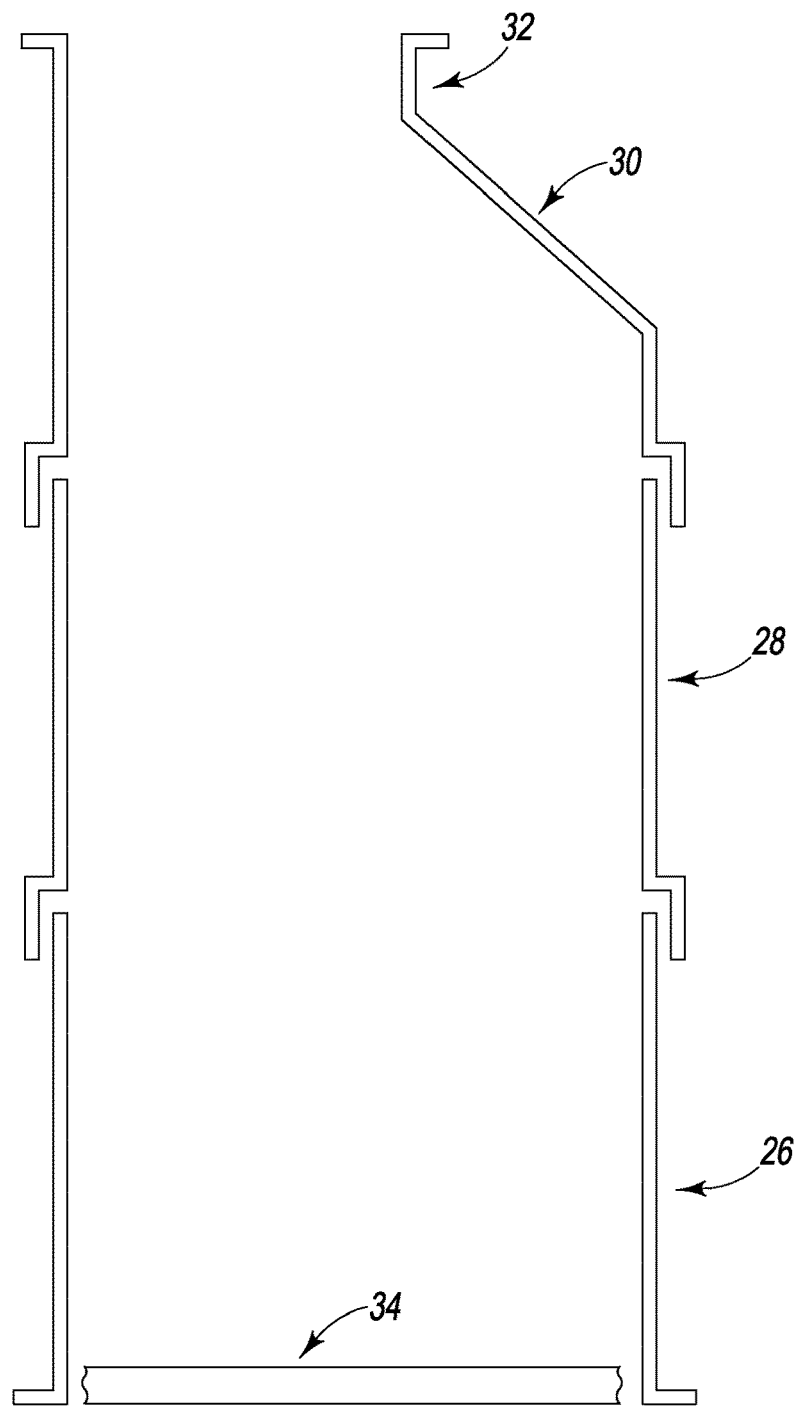
FIG. 5 is a cross-sectional view of second embodiment of the vault liner of the applicant's invention.

Referring to FIG. 5, a vault 2 in accordance with the applicant's invention includes three telescoping or nesting sections, 26, 28, and 30. These nesting sections, which typically would be round, are constructed of a light weight structurally strong material such as fiberglass or a heavy duty plastic or other composite material. The top section may have a reduced diameter 32 as shown, so as to accommodate a cover of standard diameter. The height of either or both of sections 26 and 28 can be adjusted, by cutting off a portion of the top end, so that the top of section 30 will be at the desired level with respect to the ground surface, and the bottom edge of section 26 will be at the desired depth. When the pit has reached the desired depth below the sewer pipe, with the bottom section 26 in its final position, a concrete base 34 is poured within the bottom section 26. If the required depth of the vault is not that great, such as in shallower systems, section 28 may not be needed, since top section 30 may be placed on top of bottom section 26.

Figure 6:
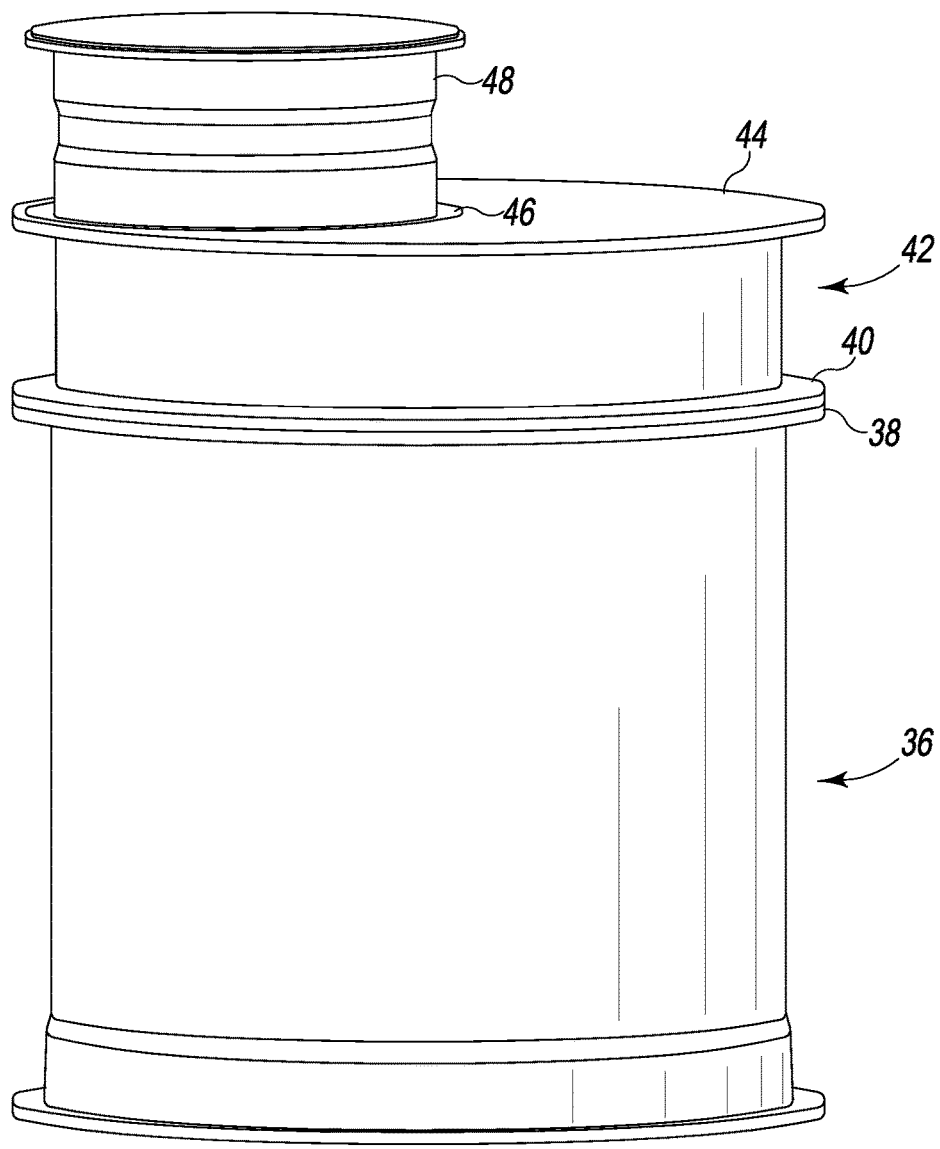
FIG. 6 is an elevation view of a third embodiment of the vault liner of the applicant's invention.

Another embodiment of the applicant's vault is shown in FIG. 6. In this embodiment, the top of a lower section 36 is provided with a flange 38, which is bolted to a flange 40 provided on the bottom of a middle section 42. The top of middle section 42 is provided with a cover 44 which is bolted to a flange 46 on the bottom of a top section 48.

Figure 7:
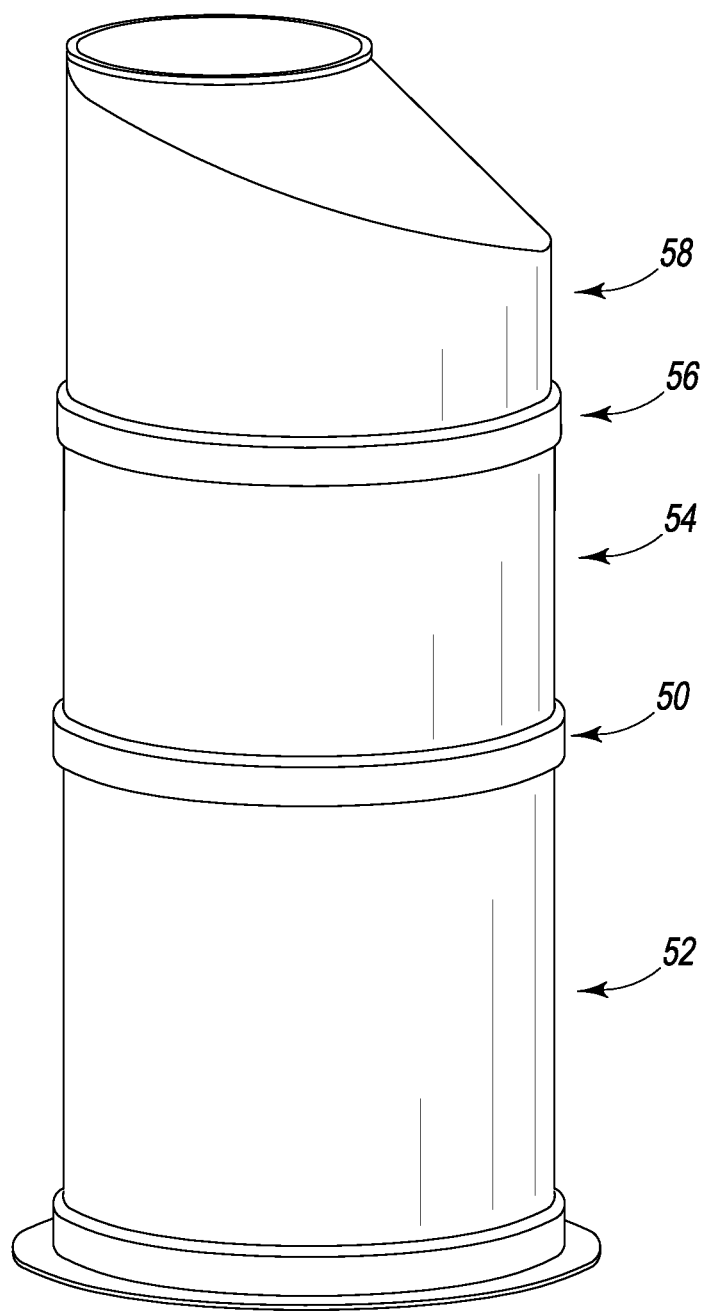
FIG. 7 is an elevation view of a fourth embodiment of the vault liner of the applicant's invention.
Figure 8:
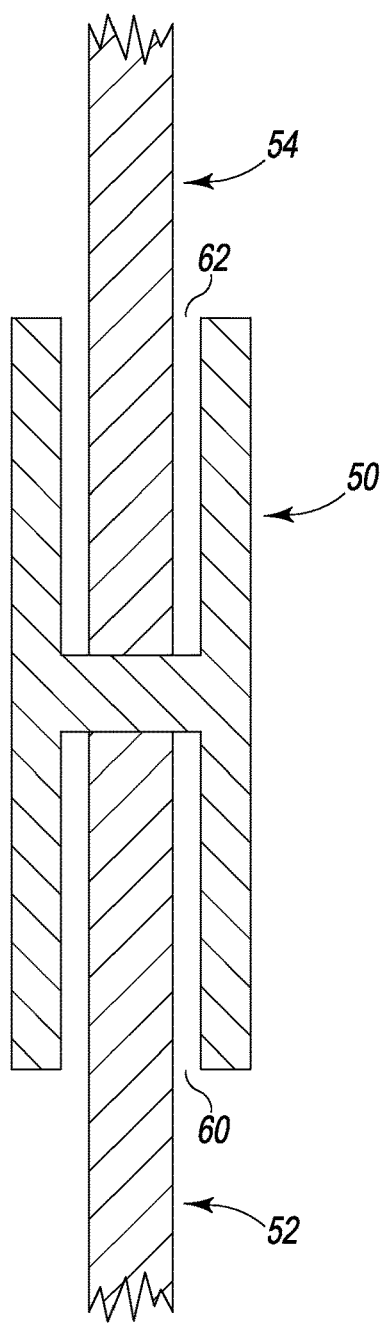
FIG. 8 is an enlarged detailed cross-sectional view of the connecting ring forming a part of the fourth embodiment of the vault as shown in FIG. 7.

Still another embodiment of the applicant's vault is shown in FIG. 7. In this embodiment, a connecting ring 50 is placed between a lower section 52 and a middle section 54. A second connecting ring 56 is placed between middle section 54 and a top section 58. The connecting rings 50 and 56 have an H-shaped cross-section as shown in FIG. 8. Lower and upper grooves 60 and 62 receive the upper edge and lower edges respectively of the sections to be connected together. An adhesive sealing material can be applied to the lower and upper grooves 60 and 62 to secure the sections and provide a water tight seal.

Figure 9:
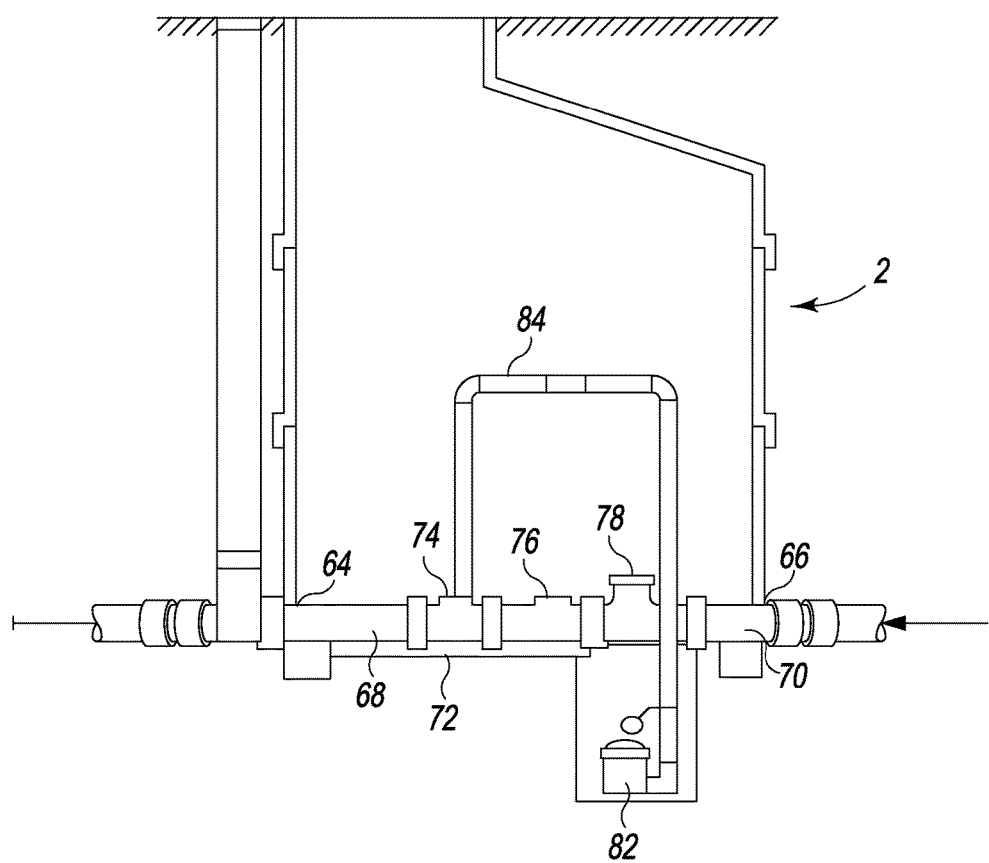
FIG. 9 is a plan view of the components and piping of the sewer flood control system of the applicant's invention housed with the vault of the applicant's invention.

Referring now to FIG. 9, the components and piping of the sewer flood control system will be described. Hole 64 and 66 are cut in the vault wall for receiving a pipe 68 connected to the public sewer system and a pipe 70 connected to the sewer pipe extending from the building. The pipes 68 and 70 are located just below and encased in the cement floor 72. Suitable coupling devices are provided between the pipes 68 and 70 and the ends of the sewer pipe which were cut to insert the components and piping of the sewer flood control system. Connected in series between the pipes 68 and 70 are two back-flow prevention valves 74 and 76, and an overflow tee coupling 78. When the public sewer system is overloaded, and the back flow prevention valves 74 and 76 are closed, flow from the building will discharge into the vault and particularly the sump 80 through the overflow tee coupling 78. An ejector pump 82 is located in the sump 80. When the sewage level in the sump 80 reaches a predetermined level, a float switch activates the ejector pump 82 and discharges the sewage in the sump through pipe 84 into the pipe 68 and the public sewage system.

The applicant's just described sewer system not only comprises several components, and the method of using and installing those components, but also provides components that may be compactly packaged and shipped as a kit. As previously alluded to, only two or three men are needed to install the system, instead of requiring large heavy equipment to dig a hole and to carry the individual pieces. This prevents damage to lawns and sidewalks etc., in existing landscaped properties. The vault being constructed of lightweight material; for example fiber glass, heavy duty plastic or other lighter weight material is readily carried by two or three workers. The bottom or a middle section can be trimmed to meet the varying depth required at each individual job site. This is a great advantage over pre-cast concrete vaults which are not adjustable in height at the job site, and are very heavy and require heavy equipment to move them. With concrete vaults, sections of different heights must be ordered to provide a desired final vault height. The system of this invention will save on labor costs to complete a job. Using the vault of this system should considerably reduce the labor required as compared to installing the heavier and more cumbersome vaults made of precast concrete or hand laid concrete blocks.

The applicant's just described sewage backup prevention system can be used with sewers at varying depths, for instance, from 4 feet deep to 14 feet deep, with materials of adequate strength, it could be used with much deeper sewers, as vault sections can be installed one on top of the other to make a very deep vault. The top section usually has an opening of about 24 inches in diameter, so as to receive existing covers which are on the market today. Alternatively, the cover can be made of the same material as the vault, that is lightweight material, for example fiberglass or plastic.

To satisfy OSHA requirements, when a hole is dug by hand and exceeds a 4 foot depth, cave in protection must be provided. The lower section of the applicant's vault can be lowered into the hole by ropes or chains, so that digging can proceed inside and under it, as the dirt from the hole is removed.

Figure 10:
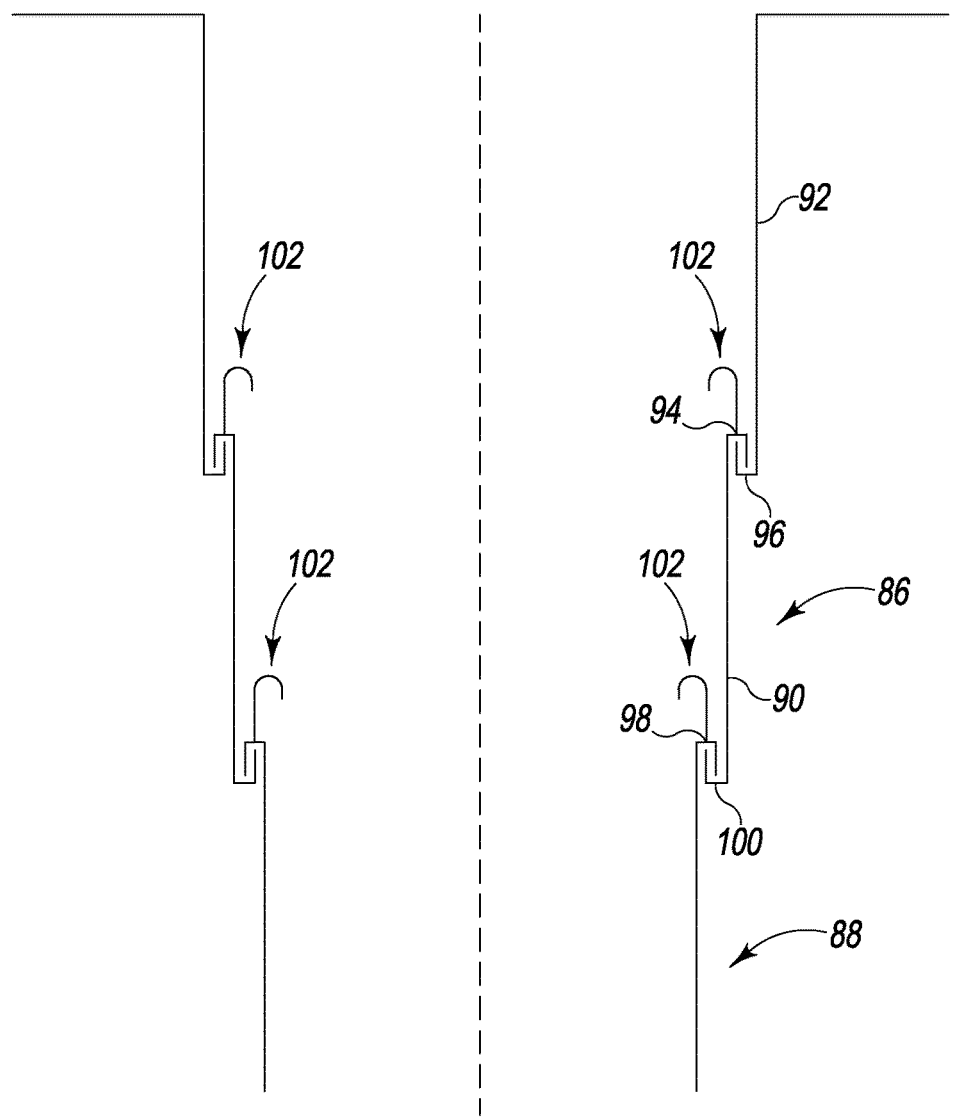
FIG. 10 is cross-sectional view of a shoring which may be used when digging the hole for installation of the vault of the applicant's invention.

Should the responsible authorities determine that the vault formed of sections 12,14, and 16 of FIG. 1 do not meet the applicable shoring requirements when men are digging and working in the hole for the vault, a telescoping shoring 86 as shown in FIG. 10 can be used. Again, telescoping shoring 86 is shown to be formed of three sections 88, 90, and 92. As a hole is dug by hand of sufficient diameter to accommodate section 92, it is lowered by hand into the hole. As the hole is dug to a depth deeper than the height of top section 92, section 90 is lowered inside of top section 92. As the hole is dug deeper, the section 90 will drop until the downwardly opening flange 94 on section 90 engages the upwardly opening flange 96 on section 92. Similarly, when the depth of the hole exceeds to combined height of sections 90 and 92, section 88 is lowered within sections 90 and 92. As the hole is dug deeper, the section 88 will drop until the downwardly opening flange 98 on section 88 engages the upwardly opening flange 100 on section 90. Hooks 102 are provided at the top of the flanges 94 and 98 to accommodate ropes or chains for lowering and raising the sections 88 and 90 into the hole as it is dug or after the work is completed removing the shoring.

Figure 11:
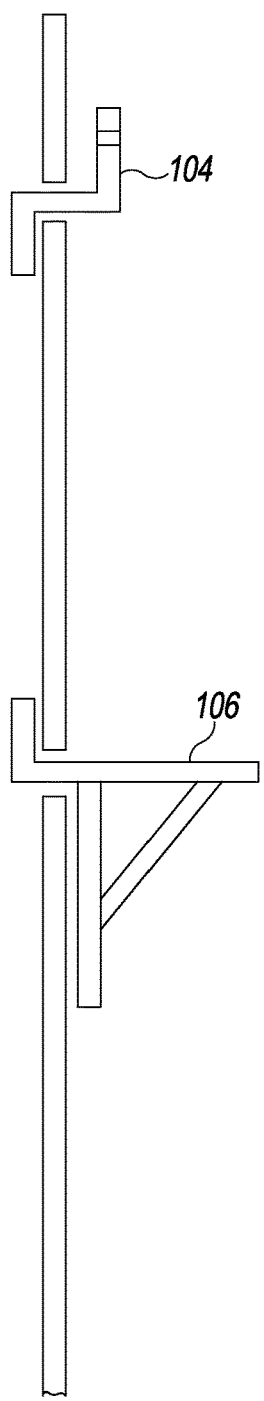
FIG. 11 is a cross-sectional view of a wall of the vault of the applicant's invention, showing the placement of a clip and a step in a wall of the vault of the applicant's invention.

As shown in FIG. 11 hanging clips 104 and stairs 106 can be added after the entire vault is set. These steps can be made of metal wrapped in plastic or fiberglass to accept glue, and because of their design will support a heavy weight.

The bottom section of the applicant's vault may be provided with an inside or outside lip to prevent the vault from creeping up with alternating freezing and thawing. A poured concrete base or a ring like member could also be placed under the bottom portion of the vault to prevent it from sinking. Alternatively, a poured concrete base or a ring like member extending beyond the outer and inner diameter of the lower section may be provided to support the lower section of the vault.

Any ground water entering the vault is pumped or flows to the public sewage system and would then have to go through the treatment facility to be cleaned, causing more flooding in the sanitary sewer system because it adds water into an already backed-up sewer system. The watertight sealing of all joints between sections of the vault, of any slots provided for clips or steps, and of the lower section to the concrete floor will protect the ground water surrounding the vault from being contaminated with sewer water.

The several embodiments of the applicant's vault have been developed using fiberglass material. The applicant has found the fiberglass tanks and vaults have many advantages of those made of concrete, including the following:
1. Fiberglass tanks and vaults are lighter than concrete and therefore easier to install. No heavy equipment is needed to transport them. This can be very helpful in areas which are harder to access or if weather conditions are less than ideal.
2. Fiberglass tanks and vaults will last longer than concrete. Wastewater releases gases that corrode concrete tanks and vaults to rubble over long periods of time. Concrete tanks begin to crack and corrode almost immediately with a useful life of approximately 20-30 years. A fiberglass tank is unaffected by sewage gases and therefor a useful life will well exceed 30 years, probably 50-75 years.
3. Concrete tanks and vaults are highly absorbent of water. Heat and humidity above variable water levels in a closed tank increase absorption causing corrosion that leads to expansion and ultimately cracking of the concrete.
4. Concrete has high thermal conductivity, which in cold weather results in freezing temperatures extending down into the vault. Water or humid air in contact with the concrete, results in cracking and deterioration of the concrete.
5. Fiberglass tanks and vaults cannot be penetrated and damaged by tree roots. Concrete tanks and vaults can.

While preferred embodiments of the sewer flood control system of this invention, and various modification of it have been shown and described, it should be apparent to those skilled in the art that what has been described is considered at present to be an exemplary embodiment of the sewer flood control system of this invention. In accordance with the Patent Statute, changes may be made in the sewer flood control system without actually departing from the true spirit and scope of this invention. The appended claims are intended to cover all such changes and modifications which fall in the true spirit and scope of this invention.

What is claimed is:
1. A flood control system comprising:
   a vault for burial in the ground, said vault including a top section having walls formed of fiberglass, heavy duty plastic, or a composite material, and a bottom section having walls formed of fiberglass, heavy duty plastic, or a composite material, which are readily moved and positioned manually in a hole in the ground,
   a base upon which said bottom section rests,
   sealing material applied between said top section and said bottom section, and between said bottom section and said base to form water tight connections,
   a public sewer pipe extending through the wall of the bottom section, and a sewer pipe from a building extending through the wall of the bottom section,
   a pair of check valves connected in series between said public sewer pipe and said sewer pipe from the building, such that when said public sewer system is in an overload condition, said check valves will close and prevent flow from said public sewer system into the building,
   a discharge outlet for providing for flow of sewage from the building into the vault when the check valves are closed,
   a sump provided below said base, for collecting sewage flowing into said vault,
   an ejector pump for discharging sewage in said sump to said public sewer pipe.

2. The flood control system of claim 1, wherein the bottom edge of the top sections is formed with a flange, for receiving top of the bottom section.

3. The flood control system of claim 2, wherein the top of the bottom section is of increased thickness with respect to the rest of the sidewall, so as to provide a stronger and more substantial rigid and secure connection with said flange of the top section.

4. The flood control system of claims 1, wherein the bottom and the top of the bottom section is of increased thickness with respect to rest of the sidewall, such that it can be cut between its top and bottom to form two bottom sections.

5. The flood control system of claim 1, wherein said base is waterproof.

6. The flood control system of claim 5, wherein an adhesive sealing material is applied between said flange of said top section and said top of the bottom section, so as to form a watertight seal.

7. A method of installing a sewer flood control system, comprising the steps of, digging a hole by man power only slightly larger than the cross section of a bottom vault section, lowering said bottom vault section by man power only into said hole, lower said a top vault section into said hole by man power only to rest of top of said bottom vault section, installing a base under said bottom vault section, sealing the joint between said top vault section and said bottom vault section, providing a water tight sump below said base, extending a public sewer pipe extending through the wall of the bottom section, extending a sewer pipe from a building extending through the wall of the bottom section, connecting a pair of check valves in series between said public sewer pipe and said sewer pipe from the building, such that when said public sewer system is in an overload condition, said check valves will close and prevent flow from said public sewer system into the building, providing a discharge outlet for providing for flow of sewage from the building into the vault when the check valves are closed.

8. A flood control system comprising:
a vault for burial in the ground, said vault including a top section having walls formed of fiberglass, heavy duty plastic, or a composite material, and a bottom section having walls formed of fiberglass, heavy duty plastic, or a composite material, which are readily moved and positioned manually in a hole in the ground so as to not require the use of motorized heavy equipment to handle them,
stairs are secure to the inside surface of said walls of said top and bottom section,
a base upon which said bottom section rests,
sealing material applied between said top section and said bottom section, and between said bottom section and said base to form water tight connections,
a public sewer pipe extending through the wall of the bottom section, and a sewer pipe from a building extending through the wall of the bottom section,
a pair of check valves connected in series between said public sewer pipe and said sewer pipe from the building, such that when said public sewer system is in an overload condition, said check valves will close and prevent flow from said public sewer system into the building,
a discharge outlet for providing for flow of sewage from the building into the vault when the check valves are closed,
a sump provided below said base, for collecting sewage flowing into said vault,
an ejector pump for discharging sewage in said sump to said public sewer pipe.

9. A flood control system comprising:
a vault for burial in the ground, said vault including a top section having walls formed of fiberglass, heavy duty plastic, or a composite material, and a bottom section having walls formed of fiberglass, heavy duty plastic, or a composite material, which are readily moved and positioned manually in a hole in the ground so as to not require the use of motorized heavy equipment to handle them,
clips are secure to the inside surface of said walls of said top and bottom sections,
a base upon which said bottom section rests,
sealing material applied between said top section and said bottom section, and between said bottom section and said base to form water tight connections,
a public sewer pipe extending through the wall of the bottom section, and a sewer pipe from a building extending through the wall of the bottom section,
a pair of check valves connected in series between said public sewer pipe and said sewer pipe from the building, such that when said public sewer system is in an overload condition, said check valves will close and prevent flow from said public sewer system into the building,
a discharge outlet for providing for flow of sewage from the building into the vault when the check valves are closed,
a sump provided blow said bae, for collecting sewage flowing into said vault,
an ejector pump for discharging sewage in said sump to said public sewer pipe.

* * * * *